United States Patent [19]
Holland et al.

[11] Patent Number: 5,155,785
[45] Date of Patent: Oct. 13, 1992

[54] OPTICAL FIBER INTERCONNECTION APPARATUS AND METHOD

[75] Inventors: William R. Holland, Ambler, Pa.; Muhammed A. Shahid, Ewing Township, Mercer County, N.J.

[73] Assignee: AT&T Bell Laboratories, Murray Hill, N.J.

[21] Appl. No.: 785,112

[22] Filed: Oct. 30, 1991

Related U.S. Application Data

[63] Continuation-in-part of Ser. No. 694,166, May 1, 1991, abandoned.

[51] Int. Cl.⁵ .................... G02B 6/26; B65H 69/02
[52] U.S. Cl. .................... 385/89; 385/24; 385/77; 385/137; 385/49; 156/158
[58] Field of Search .............. 385/16, 17, 24, 25, 385/31, 88, 89, 137, 129, 130, 76, 77; 156/60, 158, 169, 171, 178, 179

[56] References Cited

U.S. PATENT DOCUMENTS

| | | | |
|---|---|---|---|
| 3,883,222 | 5/1975 | Gunderson | 385/24 |
| 4,653,849 | 3/1987 | Boirat et al. | 385/17 |
| 4,653,850 | 3/1987 | Boirat et al. | 385/17 X |
| 4,732,446 | 3/1988 | Gipson et al. | 385/24 |
| 4,807,955 | 2/1989 | Ashman et al. | 385/88 X |
| 4,818,058 | 4/1989 | Bonanni | 385/65 X |
| 4,823,403 | 4/1989 | Twietmeyer | 385/24 |
| 4,859,022 | 8/1989 | Opdahl et al. | 385/25 X |
| 4,863,232 | 9/1989 | Kwa | 385/88 |
| 4,998,796 | 3/1991 | Bonanni et al. | 385/77 X |
| 5,009,477 | 4/1991 | Alferness et al. | 385/17 |
| 5,050,955 | 9/1991 | Sjölinder | 385/24 |
| 5,073,000 | 12/1991 | Derfiny | 385/88 X |

OTHER PUBLICATIONS

"Glass Waveguides on Silicon for Hybrid Optical Packaging," by C. H. Henry et al., *Journal of Lightwave Technology*, vol. 7, No. 10, Oct. 1989, pp. 1530-1539.

"Curvature loss formula for optical fibers", by D. Marcuse, *Journal of Optical Society of America*, vol. 66, No. 3, Mar. 1976, pp. 216-220.

"Monolithic wavelength-flattened 1×7 single-mode fulsed fiber couplers: theory, fabrication, and analysis," by D. B. Mortimore et al., *Applied Optics*, vol. 30, No. 6, Feb. 20, 1991, pp. 650-659.

*Primary Examiner*—Brian Healy
*Attorney, Agent, or Firm*—R. B. Anderson

[57] ABSTRACT

A substantially parallel array of printed wiring boards (11A-E) each support a light source element (13A-E) and a light detector element (14A-E). Each light source element is connected to all of the light detector elements of the other printed wiring boards by optical fibers (18) supported in arcuate grooves (16) of an optical backplane member (12). Each source element is also connected to a source terminal (26) and each detector element is connected to a detector terminal (27), which permit bypass interconnections between selective source elements and detector elements. In another embodiment (FIGS. 10 and 11) a broad surface (33) of the optical backplane member (32) contacts edges of the printed wiring boards (31A-C).

27 Claims, 6 Drawing Sheets

OPTICAL FIBER INTERCONNECTION APPARATUS AND METHOD

This is a continuation-in-part of the patent application of M. A. Shahid, Ser. No. 694,166 filed May 1, 1991, now abandoned.

Technical Field

This invention relates to optical interconnections and, more particularly, to optical backplanes comprising optical fiber interconnections.

BACKGROUND OF THE INVENTION

Two important trends in modern information management and communications technology are the increasingly higher circuit densities used in electronic systems and the increased use of lightwaves for transmitting information. For long distance transmission of information, optical fibers are increasingly replacing conductive cable and radio transmission systems. Higher device densities are manifested as higher circuit densities on both microelectronic chips and printed wiring boards (PWBs).

Electronics systems are typically organized by mounting various system components on PWBs and interconnecting the PWBs with a circuit transmission element known as a backplane. The backplane may include various socket elements for receiving printed wiring boards; the PWBs may be supported by troughs or shelves in parallel arrays such that they contact a socket when inserted in the shelves. As the circuit density of the printed wiring boards increases, it becomes increasingly difficult to provide the needed backplane interconnections because, as interconnection transmission lines become thinner, their impedances increase. Moreover, the distance over which information must be transmitted by backplane conductors is normally fairly long compared to the distances transmitted on printed wiring boards. These factors may reduce the speed at which the circuits can be operated, which may defeat a principal advantage of higher circuit densities.

In addressing these problems, it has been suggested that more of the electronic system be interconnected by optical fibers or other optical waveguides. For example, the paper, "Glass Waveguides on Silicon for Optical Hybrid Packaging," C. H. Henry, G. E. Blonder and R. F. Kasaranov, *Journal of Lightwave Technology*, Vol. 7, No. 10, October 1989, pp. 1530–1539, describes a method for using photolithography to define glass optical waveguides in a manner similar to the photolithographic definition of printed circuits. Such "printed circuit" optical waveguides always have a much greater loss than optical fibers, and it is recognized that they are practical only for transmitting information over a short distance. Moreover, significant optical losses invariably result from abrupt changes of direction of optical waveguides so that it is difficult to use optical waveguides to transmit light from one substrate to another.

Accordingly, there has been a long-felt need for apparatus that is easy to use and that can efficiently transmit large quantities of information between circuit component substrates such as printed wiring boards.

SUMMARY OF THE INVENTION

In accordance with an embodiment of the invention, large quantities of information are transferred between adjacent flat substrate members such as printed wiring boards by, first, providing optical input and output elements on corresponding common areas near a first edge of each flat member. For example, all of the electronic output of a given PWB is translated in a known manner by a laser source to constitute an optical output. An optical detector constitutes the input element for each PWB. In one embodiment, a backplane member is then arranged transverse to the parallel array of PWBs such that one edge of it contacts one edge of each PWB at or near the common area containing the optical input and output elements. A plurality of arcuate grooves for supporting optical fibers is provided in the optical backplane member which connect each optical output element of each PWB with all of the optical input elements of the other PWBs. Thus, the optical backplane contains a complex arrangement of arcuate grooves of varying depth, and each groove supports an optical fiber, such fibers connecting each optical output element with all of the optical input elements of the other printed wiring boards.

If each PWB carries a conventional electronic circuit, each output element may be a laser source for converting electrical signals to light and each of the input elements may be a photodetector that converts optical information from various sources to electrical energy for processing by the printed wiring board. If the transmission paths on the PWB are optical waveguides, the optical outputs are the outputs of such waveguides, which are then transmitted by the optical fibers to the inputs of optical waveguides of the other PWBs which constitute the optical inputs.

Because of the low loss and large bandwidth of optical fibers, large quantities of information can be converted to light in a known manner by a single laser source for transmission by optical fibers to the various photodetectors of the other PWBs. Appropriate addressing means accompanying each signal directs the information to the appropriate wiring board and then to the appropriate components of such printed wiring board. The optical backplane is mounted at ninety degrees with respect to the parallel array of the PWBs, and each arcuate groove is made to have a sufficiently large radius of curvature that the optical fiber is able to easily fit within the groove and transmit information with a minimum of loss. The optical fibers are, of course, much less lossy than printed optical waveguides would be.

In accordance with another feature of the invention, each optical output or optical source is connected by an optical fiber to a source terminal of the backplane member and each optical input or detector is connected to a detector terminal of the backplane member. It will be seen from the description below that the backplane is an inherently complex arrangement of interconnections. Consequently, a broken or damaged optical fiber would be difficult to fix after installation and operation. By providing the source and detector terminals, one can easily provide a "jumper" interconnection between appropriate optical fibers of the source and detector terminals to bypass a broken connection of the backplane member.

In another embodiment of the invention, an optical backplane member is arranged such that a broad surface of it contacts the edges of the PWBs. The thickness of the optical backplane is sufficient to provide a sufficiently large radius of curvature to the optical fibers which are supported on the broad surface opposite the PWBs. The optical fibers extend through apertures in the backplane member, and because two or more apertures can be made for each PWB, the PWB input and output elements may be located at two or more regions of each PWB. A convenient method for assembling this embodiment, as will be described below, also contributes to its practical utility.

These and other objects, features and advantages of the invention will be better understood from a consideration of the following detailed description taken in conjunction with the accompanying drawing.

DETAILED DESCRIPTION

Figure 1:
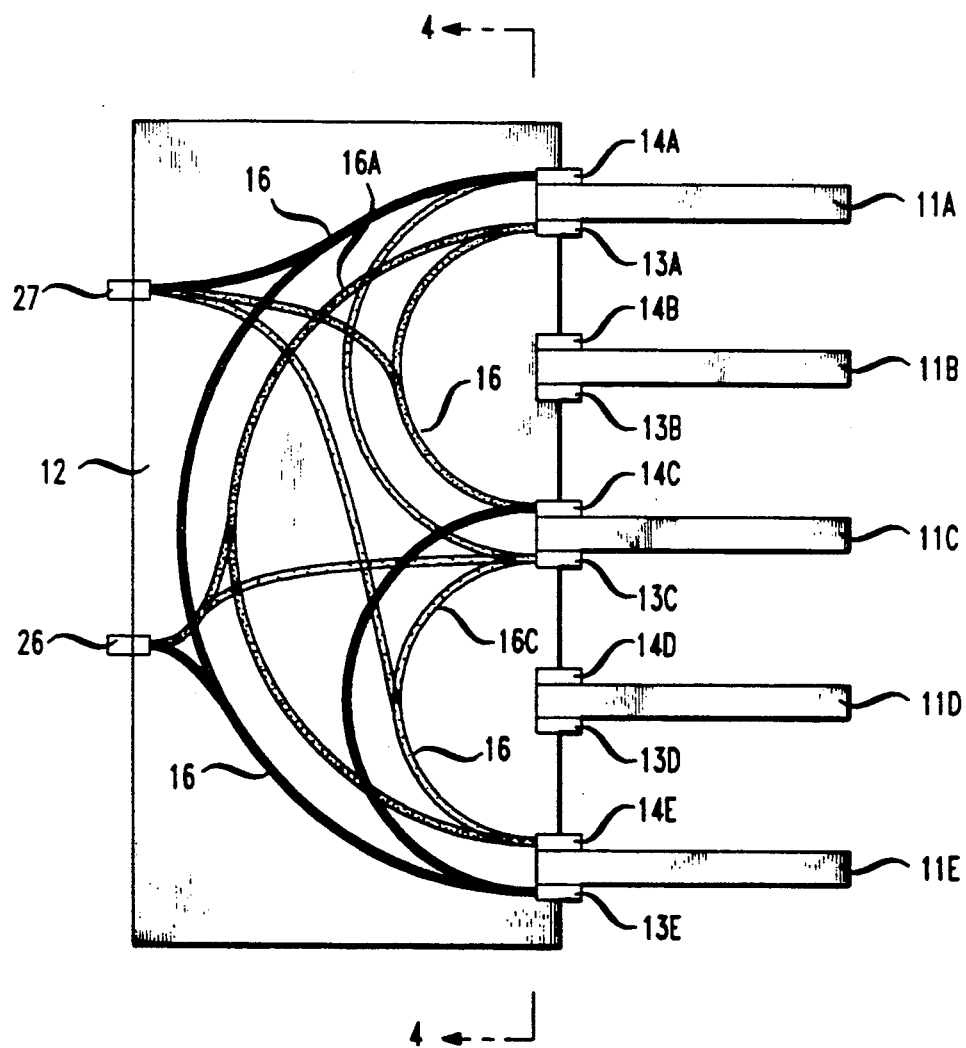
FIG. 1 is a schematic top view of optical interconnection apparatus in accordance with one embodiment of the invention.
Figure 2:
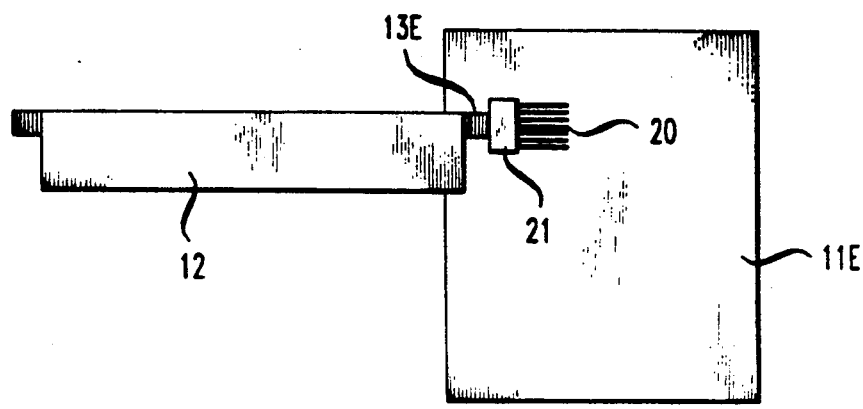
FIG. 2 is a side view of the apparatus of FIG. 1.
Figure 3:
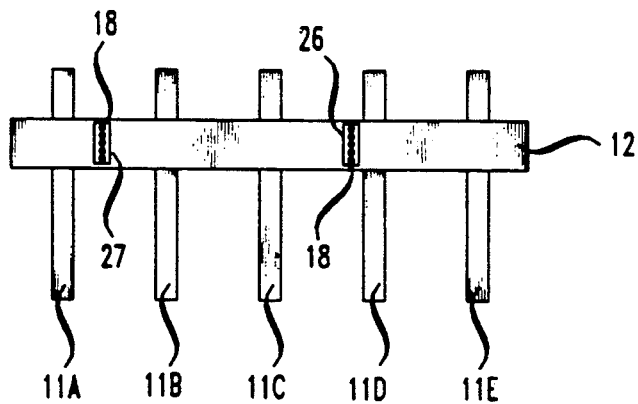
FIG. 3 is a rear view of the apparatus of FIG. 1.

Referring now to FIGS. 1, 2, and 3, there is shown schematically a parallel array of printed wiring boards (PWBs) 11A-11E which contact along one edge thereof an optical backplane member 12. The PWBs contain on one side thereof optical source elements 13A-13E and on the other side thereof optical detector elements 14A-14E. The backplane member 12 contains a plurality of arcuate grooves 16, each of which connects a source element 13 to one of the detector elements 14. The source elements 13A-13E constitute optical outputs of the PWBs and the detector elements 14A-14E constitute optical inputs for each PWB.

It is to be understood that the drawings are schematic only, are not to scale, and have been greatly simplified to aid understanding. In the interest of simplification, only the grooves associated with printed wiring boards 11A, 11C, and 11E have been shown. The purpose of the grooves 16 is to support optical fibers which, for clarity, have not been shown in FIG. 1. As a further aid for understanding, the grooves 16 connecting source element 13E with detector elements 14A and 14C are shown as heavy lines, the grooves 16 interconnecting source element 13A with detector elements 14C and 14E are shown as intermediate lines, and the grooves 16 associated with source 13C are shown as light lines. One can appreciate that it would be difficult to follow the interconnections if all of the grooves for all five printed wiring boards were shown. Nevertheless, it is to be understood that grooves (not shown) interconnect source element 13B with detector elements 14A, 14C, 14D and 14E, source element 13D with detector elements 14A, 14B, 14C and 14E, detector element 14B with source elements 13A, 13C, 13D and 13E, and detector element 14D with source elements 13A, 13B, 13C and 13E.

Figure 4:
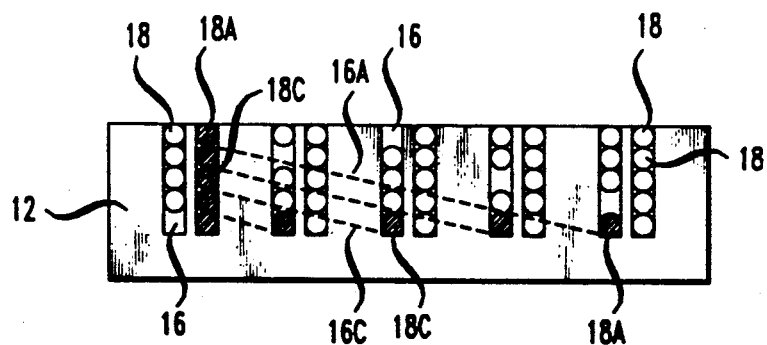
FIG. 4 is a schematic view of grooves for containing optical fibers in the apparatus of FIG. 1.

FIG. 4, which likewise is not to scale, shows a section of backplane element 12 containing the various grooves 16. One can see that the various arcuate grooves converge at each source element and detector element, and in these regions the grooves 16 are made sufficiently deep to accommodate a number of optical fibers 18 equal to the number of printed wiring boards, i.e., five optical fibers.

The purpose of the arcuate grooves is to support optical fibers 18 that interconnect each source element 13 of each PWB with all of the detector elements 14 of the other PWBs. Again, for clarity, only a few of the paths of the optical fiber interconnections are shown in FIGS. 4 and 1. For example, optical fiber 18A (FIG. 4) interconnects source element 13A (FIG. 1) with detector element 14E and is supported by a groove 16A of varying depth, as shown in FIGS. 4 and 1. Likewise, optical fiber 18C connects source element 13C with detector element 14E and is supported by a groove 16C of varying depth, as shown in FIG. 4. One can appreciate that the various grooves 16 of FIG. 1 are of varying depth, the maximum depth being at the point of convergence at the source and detector areas. Various ones of the grooves intersect, at which point the optical fibers cross over, but such crossover does not create any problems because the optical fibers are usually at different depths. The separations of the successive printed wiring boards 11 are sufficiently large that an arcuate optical fiber interconnecting them does not have such a small radius of curvature as to interfere with transmission. The increase of loss of an optical fiber with increased curvature is described, for example, in the paper, "Curvature Loss Formula for Optical Fibers," D. Marcuse, *Journal of the Optical Society of America*, Vol. 66, No. 3, March 1976, pp. 216-220. The optical fibers are used as bus transmission lines for transmitting the outputs of each PWB 11A-E to inputs of all of the other PWBs.

Figure 5:
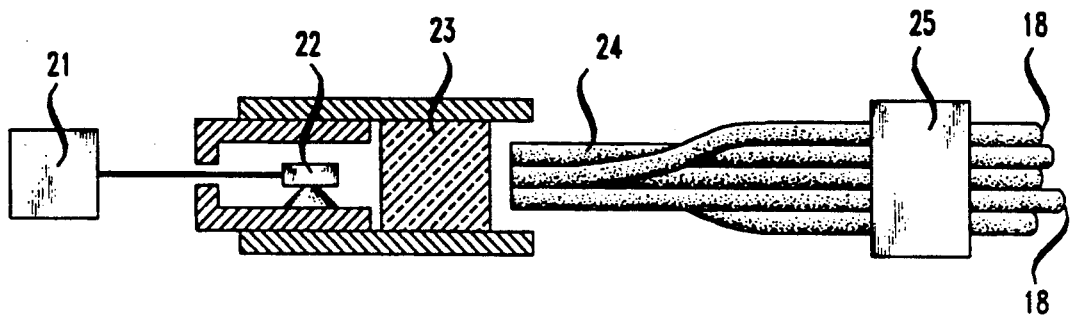
FIG. 5 is a schematic view of an optical source that may be used in the apparatus of FIG. 1.
Figure 6:
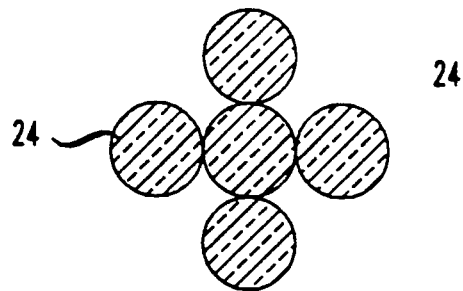
FIG. 6 is a schematic view of an optical fiber bundle that may be used in the apparatus of FIG. 5.

The apparatus used on each PWB for converting an electrical output to an optical output is illustrated in FIG. 2, in which the printed wiring board 11E comprises a plurality of electrical transmission lines 20 which are directed to a processor 21 that controls the optical source 13E. Referring to FIG. 5, the processor 21 preferably excites a laser 22 which emits light into a graded index rod lens 23 and then to a bundle of optical fibers 24 shown in section in FIG. 6. The optical fiber bundle of FIG. 6 is arranged into a vertical array which is held in place as indicated schematically by a support element 25. The optical fibers 18 of FIG. 5 are then arranged in the grooves of the backplane member 12, as shown in FIG. 4, for distribution to the other PWBs. As is known, other light sources such as light emitting diodes (LEDs) can be used in place of laser 22.

Figure 7:
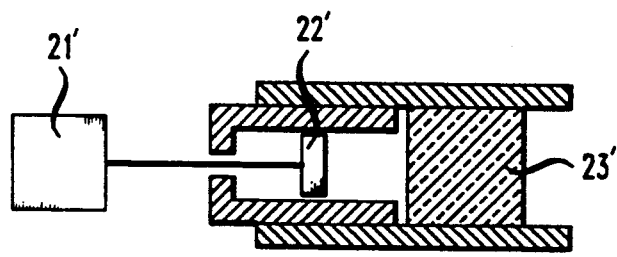
FIG. 7 is a schematic view of an optical detector that may be used in the apparatus of FIG. 1.

The detector elements 14A-E may be constructed in much the same manner except that laser element 22 is replaced by a photodetector which converts incoming light energy to electrical energy for transmission to a microprocessor which then appropriately distributes the electrical signal to the elements of the printed wiring boards. This is illustrated in FIG. 7 in which a photodetector 22' receives light from a graded index rod lens 23' and converts it to an electrical signal that is transmitted to a processor 21' for distribution to the transmission lines of the PWB. Appropriate vias through the PWBs connect the detector element side to the source element side as is known in the art.

Figure 8:
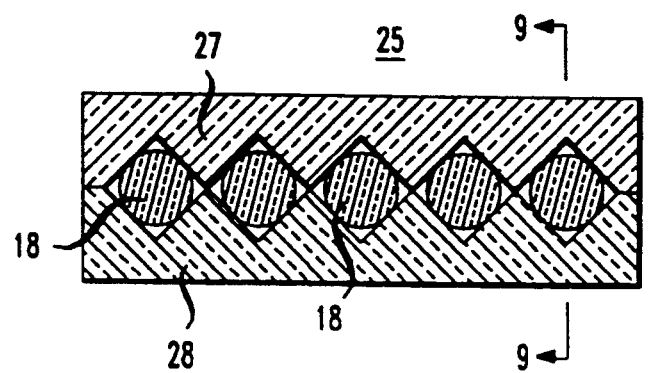
FIG. 8 is a view of a multiple fiber connector that may be used in the apparatus of FIG. 1.
Figure 9:
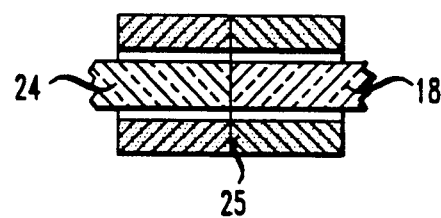
FIG. 9 is a view taken along 9—9 of FIG. 8.

Referring to FIGS. 8 and 9, the support element 25 of FIG. 5 may comprise a pair of silicon elements 27 and 28 into which a plurality of matching "V" grooves have been etched for the purpose of holding optical fibers 18 and 24. Support element 25 may conveniently be an optical fiber connector for interconnecting optical fibers 18 associated with the backplane member 12 to optical fibers 24 associated with the individual PWBs. Such connectors are known in the art as multiple fiber array (MAC) connectors. Various MAC connector packages for aligning and supporting opposite optical fibers are described, for example, in the U.S. patents of Bonanni et al., U.S. Pat. No. 4,998,796 and Bonanni, U.S. Pat. No. 4,818,058, both incorporated by reference herein.

The backplane member 12 is shown for illustrative purposes as having an arrangement of sockets for reception of the PWBs 11. This sort of an arrangement is used with present electrical backplanes to aid in the insertion and removal of PWBs, but it is not necessary to the practice of the invention. In concept, it is only necessary that the source elements 13 and detector elements 14 be included in a common area on each of the PWBs near the edge of the PWB that makes contact with the backplane member 12. Conventional electrical backplanes are normally located in a plane that is at ninety degrees with respect to the plane of the backplane 12. The reason for extending the backplane in the direction shown is to provide support for the optical fibers in a manner that will not require any abrupt changes in direction of the optical fibers. Thus, the arcuate or U-shaped grooves can be made so as to have at all locations a radius of curvature which is sufficiently large to avoid significant loss by the optical fiber. If the backplane member 30 were folded to be at ninety degrees with respect to that shown, the optical fibers would then have to be abruptly bent, which would introduce loss.

The gathering of complex electrical circuitry of each PWB to a single point and the conversion of electronic signals to optical signals for transmission over a single light beam is a matter within the skill of a worker in the art. Typically, the processor 21 would add address signals to the various electronic signals being converted to optical signals, the addresses directing the signals to the appropriate destination after detection by an optical detector. Because of the large transmission capabilities of optical fibers, a single fiber is clearly practical for transmitting information between PWBs. The conversion of optical signals to electronic signals by the photodetector and their suitable distribution are also matters within the skill of a worker in the art.

The structure of backplane member 12 is complex, with its large number of arcuate grooves of varying depths. It is anticipated that the invention will be useful for many more than five PWBs which would make the assembly of grooves even more complicated. The offsetting advantage is that the backplane members can be mass produced for use as general purpose backplanes for interconnecting any of various different kinds of PWBs. Thus, in a given system, it may not be necessary to transmit information from, say, PWB 11E to PWB 11B. Nevertheless, the invention provides that capability, which in turn provides a great deal of design flexibility in its use with any of various kinds of electronic systems. As is known, the actual size of optical fibers is very small, typically two hundred fifty microns in diameter, and the package sizes of optical sources such as lasers and photodetectors are also quite small and do not add appreciably to the bulk of the systems. If a thinner plastic coating is used, the optical fiber diameter may be on the order of one hundred forty microns. It is anticipated that backplane members 12 can be made of plastic and made at low cost by injection molding. The optical fibers 18 can be permanently affixed in backplane member 12 for future connection to PWB assemblies.

The principal motivation in devising the invention was to reduce the reactive and resistive losses of printed wiring board interconnections which can limit the speed at which such systems are operated. The same motivation may lead to the incorporation of optical waveguides on the individual printed wiring boards, an approach that is now being vigorously pursued. Indeed, all of the transmission lines on the printed wiring boards could be optical waveguides, in which event, there would be no need for separate laser sources or photodetectors for interconnection. That is, if transmission lines 20 of FIG. 2 were optical waveguides, they could be coupled directly to the optical fibers 18 of FIG. 4. Obviously, the transmission lines on the printed wiring boards could be also a combination of electrical and optical transmission lines.

Referring again to FIG. 1, in addition to interconnecting all of the printed wiring boards, the invention provides interconnection paths between each source element 13A-13E and a source terminal 26, and between each detector element 14A-14E and a detector terminal 27. Referring to FIG. 3, detector terminal 27 exposes optical fibers 18 connected to detector elements of the printed wiring boards, while terminal 26 exposes optical fibers 18 connected to the source elements. If, during operation, any of the connections between any of the source elements and any of the detector elements is damaged or broken, one can make a replacement connection simply by interconnecting the appropriate terminal ends of detector terminal 27 and source terminal 26. For example, referring to FIG. 4, if the optical fiber 18A interconnecting source element 13A with detector element 14E were accidentally broken, one could make a replacement interconnection by locating the optical fiber of terminal 26 connected to source element 13A and the optical fiber of terminal 27 connected to the detector element 14E and interconnecting them with an external optical fiber. This capability makes it more practical to affix permanently the optical fibers 18 within the backplane member; for example, after the optical fibers 18 have been mounted, grooves 16 can be filled with epoxy.

From the foregoing, one can appreciate that maximum use of the invention may lead to entirely new methods of system organization. For example, all PWBs of different kinds of systems can be made with optical source and detector elements on common areas of the PWBs. Identical backplane members can then be used for providing interconnection, regardless of system requirements; the processors on each PWB provide the proper routing for fulfilling system requirements.

Figure 10:
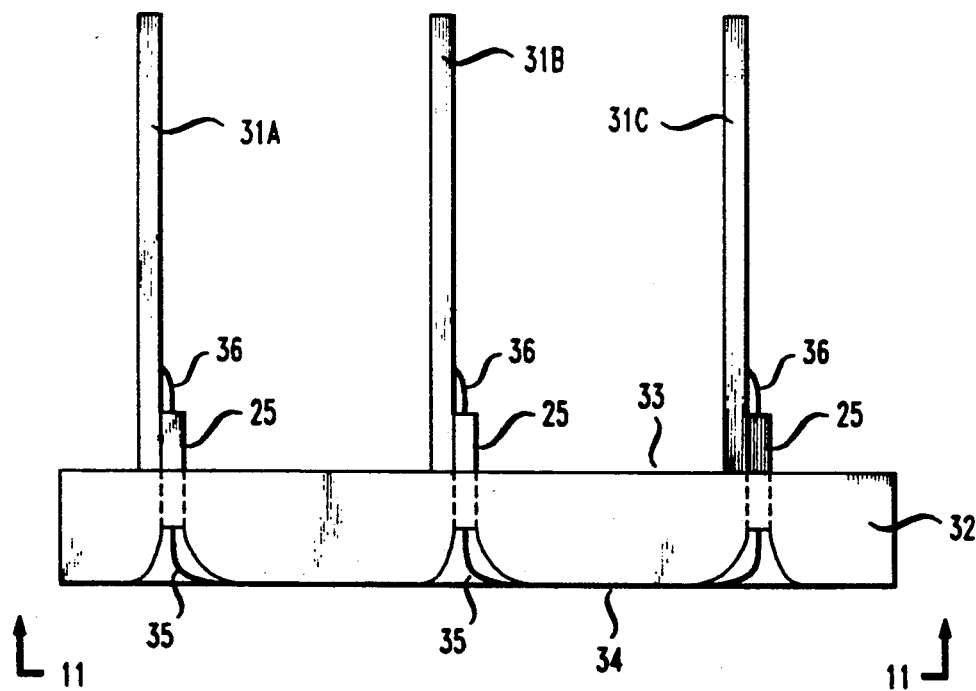
FIG. 10 is a schematic view of optical interconnection apparatus in accordance with another embodiment of the invention.
Figure 11:
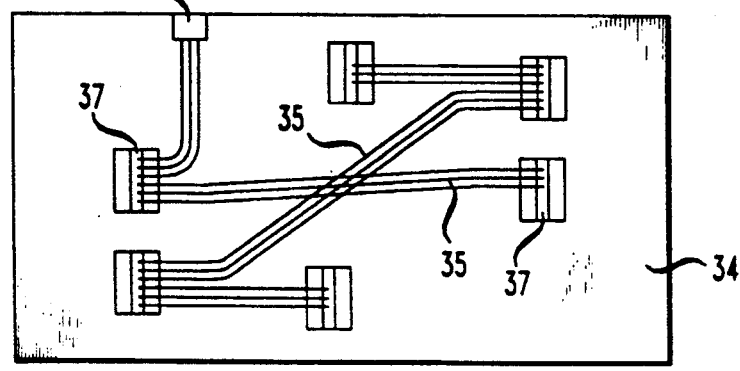
FIG. 11 is a view taken along 11—11 of FIG. 10.

Compared to conventional electronic backplanes, the optical backplane of FIG. 1 is less compact and takes up more space. Another possible disadvantage is the need to locate all of the optical inputs and outputs on identical common areas of the PWBs. Referring to FIGS. 10 and 11, these problems are alleviated by using an optical backplane member 32 for supporting a plurality of printed wiring boards 31A-31C. One broad surface 33 abuts against the edges of PWBs 31A-31C, while an opposite broad surface 34 supports the interconnecting optical fibers 35, as shown in FIG. 11. The optical fibers 35 are connected to optical fibers 36 of the printed wiring board by support elements or MAC connectors 25, which may be identical to those shown in FIGS. 8 and 9. The PWB optical fibers 36 may be connected to an optical source, an optical detector, or an optical waveguide associated with the PWB at one or at any of several locations on the PWB. As before, the optical detectors may convert incoming optical energy to electrical energy while the optical sources may convert outgoing electrical energy to optical energy. Optical fibers 35 may also be connected to external circuitry via a MAC connector 25A preferably located near the periphery of optical backplane member 34.

Figure 16:
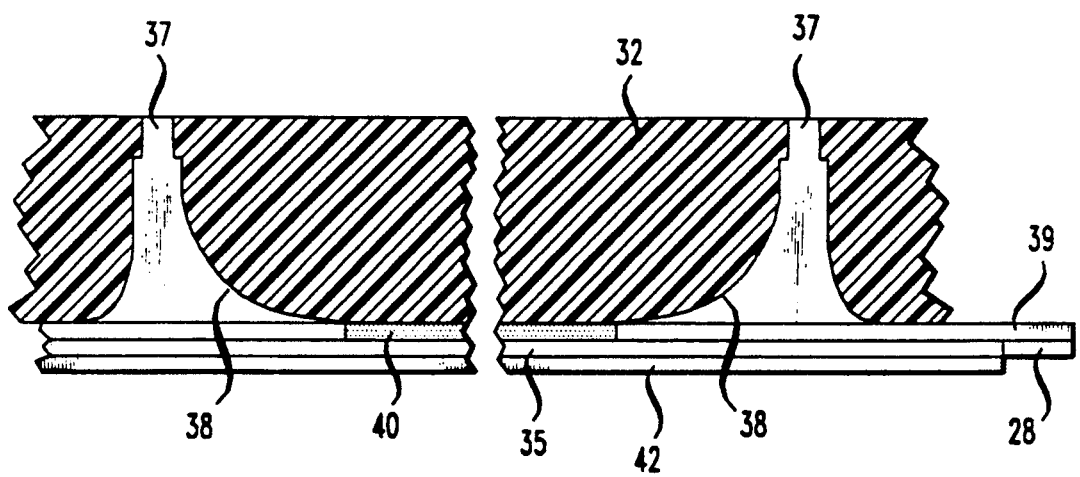

The optical backplane member 32 has a sufficient thickness between opposite surfaces 33 and 34 to provide an appropriately large radius of curvature through which each optical fiber must be bent in making the connection between the surface 34 and the MAC connector 25. Typical dimensions of backplane 32 are eight inches by sixteen inches by three inches in thickness. It can be shown that, for digital transmission at practical power levels, the minimum radius of curvature through which an optical fiber may be bent without incurring significant losses is one inch. A three inch thickness, while thicker than a normal electrical backplane, avoids much of the bulk of the apparatus of FIGS. 1 and 2 while still providing a sufficiently large radius of curvature for the optical fibers to avoid significant losses. FIG. 16 shows an enlarged view of apertures 37 in optical backplane 32 through which optical fibers 35 extend. It can be seen that wall portions 38 are rounded to permit an appropriately gradual radius for the curvature of the optical fibers after assembly has been completed. In addition to the optical fibers shown, optical backplane member 32 may support electrical power and/or ground lines for the PWBs; this is also true of the FIG. 1 embodiment.

Figure 12:
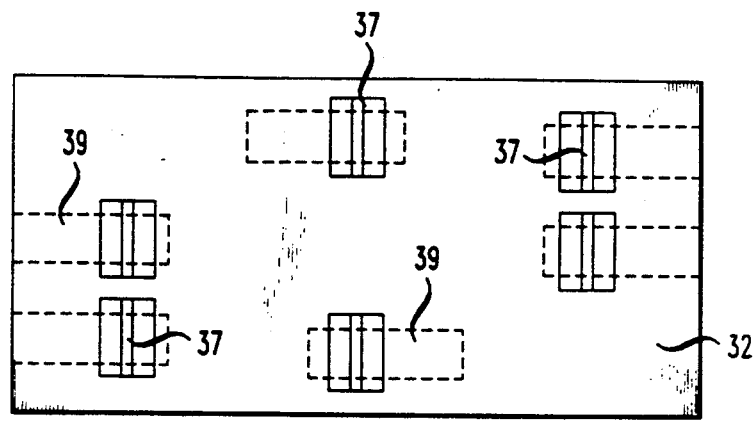
FIGS. 12-17 are views showing successive steps in assembling the apparatus of FIG. 11.

FIGS. 12-17 illustrate techniques for assembling the structure of FIGS. 10 and 11 in accordance with another aspect of the invention. Referring to FIG. 12, the first step is to make appropriate apertures 37 in the optical backplane member 32. The optical backplane member 32 may be, for example, solid plastic, and the apertures 37 are made with the appropriate rounded walls 38 discussed with reference to FIG. 16.

Figure 13:
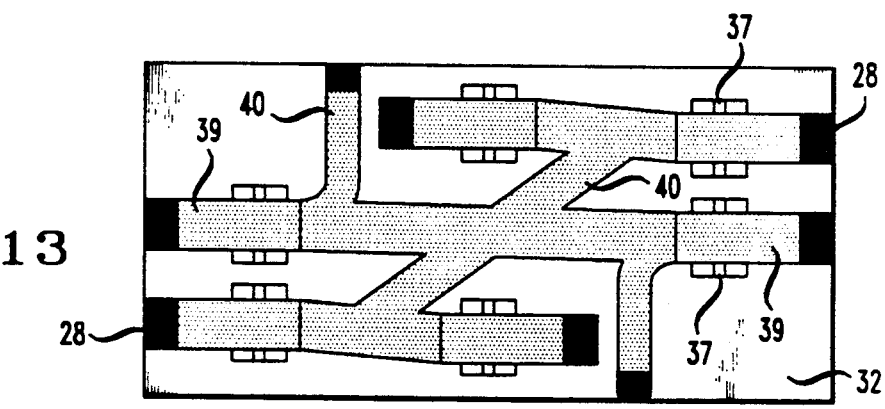

Referring to FIG. 13, the next step is to cover all of the apertures, as shown, with a "peelable" plastic sheet member 39 which may, for example, be KAPTON or MYLAR, both trademarks of the DuPont Company, Wilmington, Del. The peelable sheet is adhered to the optical backplane member 35, but such adherence is not permanent and it can be manually peeled away from the member at will; suitable adhesives include PHOTO-MOUNT, a trademark of the 3M Company of Minneapolis, Minn., and various silicone pressure sensitive adhesives. At one end of each of the sheet members 39 is a lower half of a MAC connector 28 which corresponds to the member 28 of FIGS. 8 and 9. Member 28 defines an array of V-grooves each of which is appropriate for supporting a single optical fiber. The intended paths of the optical fibers are shown in FIG. 11. The next step is to apply adhesive 40 to all regions of the optical fiber member 35 which are intended to be part of the optical fibers paths. This adhesive, which may be 500 or 600 series film adhesive, available from Bostick, Inc., of Boston, Mass., also covers the exposed surfaces of the peelable sheet members 39 and of connectors 28.

Figure 14:
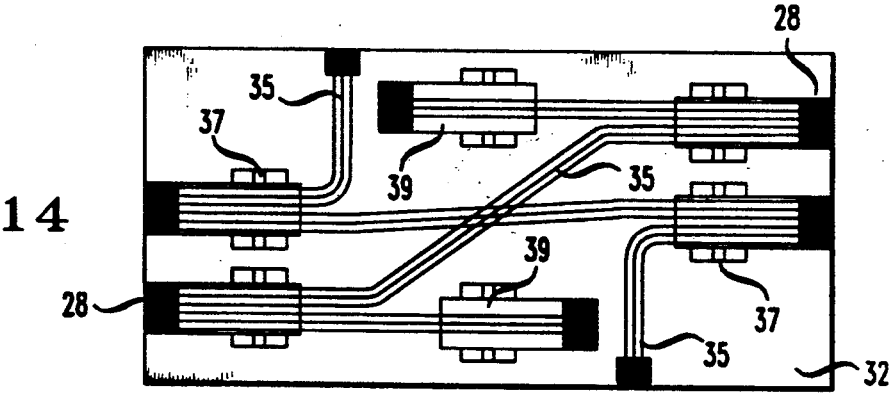

Referring to FIG. 14, optical fibers are next placed over the adhesive regions 40 such that they extend into the MAC connector portions 28. (For clarity, adhesive 40 is not shown in FIG. 14.) The optical fibers 35 may be placed manually on the adhesive, but are preferably positioned in the desired pattern using known techniques for routing fine wire electrical conductors. The placement of closely packed fine electrical copper wire is described, for example, in the U.S. patent of Swiggett et al., U.S. Pat. No. 4,693,778, granted Sep. 15, 1987, and the U.S. patent of Lassen, U.S. Pat. No. 4,541,882, granted Sep. 17, 1985.

Figure 15:
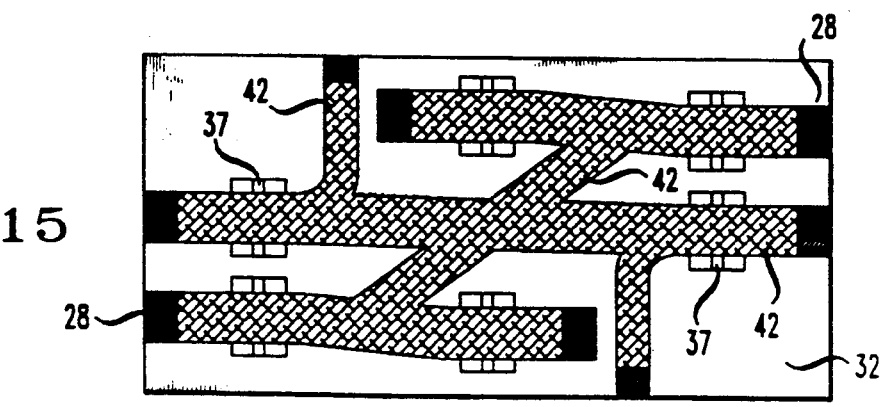

Referring to FIG. 15, an adhesive plastic encapsulation layer is next placed to overlie all of the optical fibers 35. The sectional view of FIG. 16 shows the adhesive layer 40, the peelable plastic sheet 39, the optical fiber 35, and the encapsulation layer 42 at this stage of the assembly. Finally, the upper portion of the MAC connector is fitted on the lower portion 28 to form the connector element 25 shown in FIG. 17. The connector element 25 is assembled after peeling away the optical fiber and the peelable sheet 39 from the optical backplane member. At this point, the adhesive 40 maintains adherence of the main portion of the optical fiber to the optical backplane member. After assembly of the MAC connector 25 in the position designated in FIG. 17 as (1), the connector is inserted into the aperture 37, as shown at position designated (2). The remaining connector portions 28 are peeled back and assembled into full MAC connectors in the same manner and inserted into the adjacent apertures 37. Optical fiber ends may thereafter be polished as is known in the art and connections made to corresponding MAC connectors of the individual PWBs 31A-31C to form the structure shown in FIGS. 10 and 11.

Figure 17:
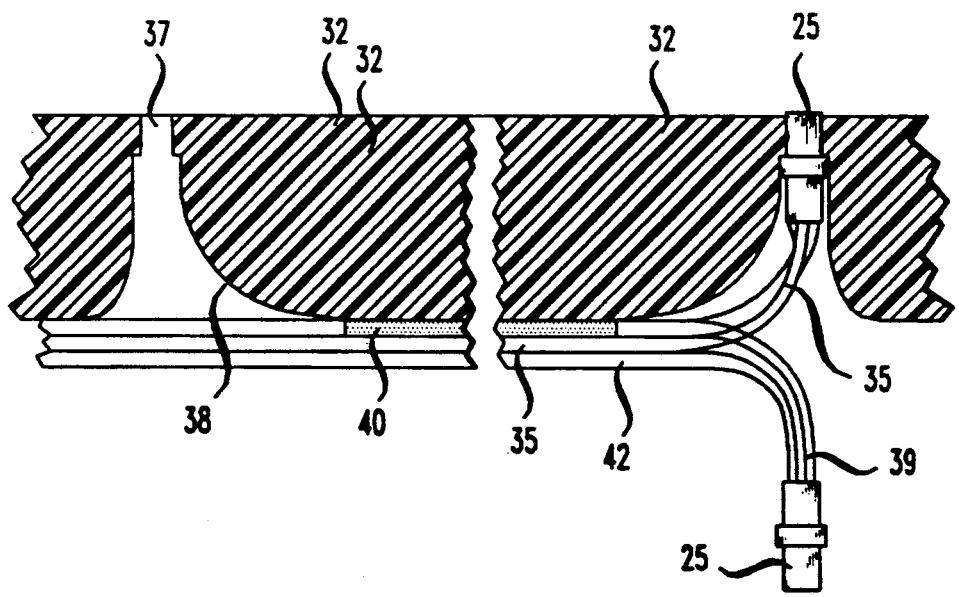
Figure 18:
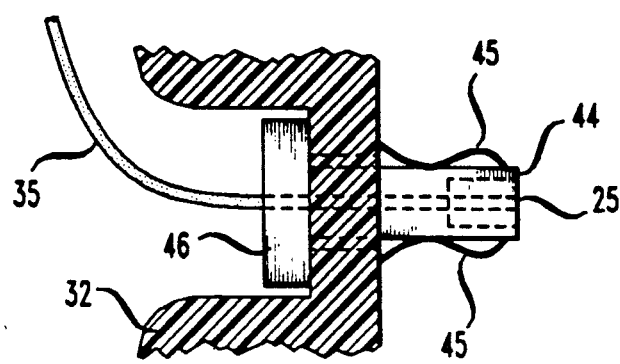
FIG. 18 is a view of apparatus that may be used for mounting a MAC connector and associated optical fibers into an optical backplane member of the type shown in FIGS. 10 and 11.

Referring to FIG. 18, which illustrates an alternative embodiment, after the MAC connector 25 has been assembled as in FIG. 17, it may be mounted in a plastic housing 44 having spring clips 45. The optical fibers 35 are extended through the housing after having been "peeled back" by the FIG. 17 step. The housing is then inserted through an opening in optical backplane 32 until a stop portion 46 is reached. After complete projection through the opening, spring clips 45 open to prevent movement to the left and, together with stop portion 46, hold the MAC connector 25 and optical fibers 35 securely within the optical backplane 32. A matching MAC connector associated with the PWB then optically connects optical fibers associated with the board to fibers 35.

Note that in the FIG. 10 and 11 embodiment, interconnections to each PWB can be made at more than one location of the PWB which may result in greater design flexibility for a given electronic system. Of course, as with the FIG. 1 embodiment, input-output elements may be concentrated in one area of each PWB if desired. The MAC connectors 25A to the external circuitry may be located wherever desired on the backplane member 34 and may be somewhat easier to use than terminals 26 and 27 of FIG. 1.

Various modifications and embodiments of the invention other than those explicitly described above may be made by those skilled in the art without departing from the spirit and scope of the invention. For example, in the embodiment of FIGS. 10 and 11, extra optical fiber connections can be made between the MAC connectors 25 and external terminals which would perform the same function as the terminals 26 and 27 of FIGS. 1 and 3, i.e., providing terminals for "jumper" connections that can substitute for broken fibers on the backplane.

We claim:

1. Interconnection apparatus comprising:
   a substantially parallel array of first flat members each defining thereon a plurality of transmission paths;
   a plurality of optical input and output elements on each of the first flat members, the optical input and output elements of each first flat member both being located within a limited area near a first edge of such first flat member and being coupled to transmission paths of the corresponding first flat member;
   a second flat member substantially transverse to the parallel array and having a first edge that contacts the first edge of each first flat member near the limited area of such first flat member;
   a plurality of arcuate grooves in the second flat member having ends at the first edge of the second flat member;
   and a plurality of optical fibers mounted in the grooves for interconnecting various input and output elements of the first flat members.

2. The apparatus of claim 1 wherein:
   the optical output elements comprise light sources and the optical input elements comprise photodetectors.

3. The apparatus of claim 1 wherein:
   at least certain ones of the transmission paths comprise optical waveguides and at least certain ones of the optical output elements comprise first ends of optical waveguides;
   and at least certain ones of the optical input elements comprise second ends of optical waveguides.

4. The apparatus of claim 1 wherein:
   the first flat member is a printed wiring board.

5. The apparatus of claim 4 wherein:
   the output elements are laser light sources and the input elements are photodetectors.

6. The apparatus of claim 1 wherein:
   the second flat member is substantially perpendicular to the first flat members and has a predominant plane that extends through the first flat members.

7. The apparatus of claim 6 wherein:
   opposite end portions of each optical fiber are connected to different first flat members;
   each end portion of each optical fiber is substantially parallel to the first flat member to which it is connected;
   and the portions of each optical fiber between opposite end portions has a substantially U-shaped configuration.

8. Interconnection apparatus comprising:
   a substantially parallel array of printed wiring boards each supporting electronic circuitry;
   each printed wiring board supporting a light source and a light detector;
   each printed wiring board further supporting means comprising the light source for converting electrical output signals to output lightwaves and means comprising the light detectors for converting lightwave signals to electrical input signals;
   a flat backplane member substantially transverse to the parallel array of printed wiring boards;
   a plurality of arcuate grooves in the backplane member, each groove extending between a pair of printed wiring boards; and
   an optical fiber mounted in each groove which is coupled at one end to a light source of one printed wiring board and at the other end to a light detector of another printed wiring board.

9. The apparatus of claim 8 wherein:
   the printed wiring boards each have a predominant first plane, the first planes being substantially parallel;
   the backplane has a predominant second plane which is substantially perpendicular to all of the first planes and which extends through all of the first planes.

10. The apparatus of claim 8 wherein:
    each optical fiber has end portions which are each substantially parallel to the printed wiring board to which it is connected;
    and the portions of each optical fiber between opposite end portions has a substantially U-shaped configuration.

11. The apparatus of claim 8 wherein:
    the light sources and light detectors of the printed wiring boards are located in common areas of such printed wiring boards;
    the common areas of each printed wiring board being located near a first edge of such printed wiring board;
    the backplane member having a first edge that contacts the first edge of each printed wiring board near the common area of such printed wiring board;
    and each of the arcuate grooves have opposite ends at the first edge of the backplane member.

12. The apparatus of claim 11 wherein:
    opposite end portions of each optical fiber are connected to different printed wiring boards;
    each end of each optical fiber is substantially parallel to the printed wiring board to which it is connected;
    and the portions of each optical fiber between opposite end portions has a substantially U-shaped configuration with a radius of curvature that is sufficiently large as to avoid a significant introduction of optical loss.

13. The apparatus of claim 12 wherein:
    the backplane member is substantially perpendicular to the printed wiring boards and has a predominant plane that extends through the printed wiring boards.

14. Interconnection apparatus comprising:
    a substantially parallel array of first flat members each containing thereon a plurality of electrical conductors for transmitting electrical energy;
    at least one optical source and one photodetector on each of the first flat members, the sources and photodetectors of each first flat member being located within corresponding common areas near a first edge of such first flat member and being coupled to electrical conductors of such first flat member;
    the photodetectors comprising means for converting optical signals to electrical signals;

the optical sources comprising means for converting electrical signals to optical signals;

a second flat member substantially transverse to the parallel array and having a first edge that contacts the first edge of each first flat member near the common area of such first flat member;

a plurality of arcuate grooves in the second flat member having ends at the first edge of the second flat member;

and a plurality of optical fibers mounted in the grooves for interconnecting various sources and photodetectors of the first flat members.

15. The apparatus of claim 14 wherein:
the first flat members are printed wiring boards.

16. Interconnection apparatus comprising:
a substantially parallel array of first flat members each defining thereon a plurality of transmission paths;

a plurality of optical input and output elements on the first flat members, the optical input and output elements of each first flat member being located within corresponding common areas near a first edge of such first flat member and being coupled to transmission paths of such first flat member;

a plurality of first arcuate grooves in the second flat member each having ends at the first edge of the second flat member, and a plurality of second and third grooves;

a plurality of first optical fibers mounted in the first grooves for interconnecting various input and output elements of the first flat members;

a plurality of second optical fibers mounted in the second grooves for interconnecting optical output elements with a first terminal of the second flat member;

and a plurality of third optical fibers in the third grooves for interconnecting the optical input elements with a second terminal of the second flat member;

the first and second terminals being exposed such that individual second optical fibers of the first terminal can be selectively connected to third individual optical fibers of the second terminal.

17. Interconnection apparatus comprising:
a substantially parallel array of printed wiring boards each supporting electronic circuitry;

each printed wiring board supporting a light source and a light detector;

each printed wiring board further supporting means comprising the light source for converting electrical output signals to output lightwaves and means comprising the light detectors for converting lightwave signals to electrical input signals;

a flat backplane member substantially transverse to the parallel array of printed wiring boards;

a plurality of arcuate grooves in the backplane member, each groove extending between a pair of printed wiring boards;

an optical fiber mounted in each groove which is coupled at one end to a light source of one printed wiring board and at the other end to a light detector of another printed wiring board;

the flat backplane member further comprising a plurality of second and third grooves for supporting second and third optical fibers;

each second optical fiber connecting a light source with a light source terminal of the backplane member, and each third optical fiber connecting a light detector with a detector terminal of the backplane member;

the source terminals and detector terminals of the backplane member being exposed such that individual second optical fibers of the source terminal can be selectively connected to individual third optical fibers of the detector terminal.

18. Interconnection apparatus comprising:
a substantially parallel array of first flat members each containing a plurality of electrical conductors for transmitting electrical energy;

each first flat member containing at least one optical output element adapted to convert electrical signals to optical signals;

each first flat member containing at least one optical input element adapted to convert optical signals to electrical signals;

each optical input element and each optical output element being located near a first edge of the first flat member upon which it is contained and being electrically coupled to an electrical conductor of such first flat member;

a second flat member substantially transverse to the parallel array and physically contacting the first edge of each first flat member;

and a plurality of optical fibers supported by the second flat member, at least a plurality of such optical fibers interconnecting various input and output elements of the first flat members.

19. The apparatus of claim 18 wherein:
the optical output elements each comprise a light source, and the optical input elements each comprise a photodetector.

20. The apparatus of claim 19 wherein:
the second flat member comprises opposite substantially planar first and second faces each having length and width dimensions substantially greater than a thickness dimension separating the first and second faces;

the first face of the second flat member contacting the first edges of the first flat members;

the optical fibers being supported on the second face of the second member;

and the optical fibers extending through apertures of the second flat member to contact optical input and output elements of the first flat members.

21. The apparatus of claim 20 wherein:
said apertures are defined by side walls extending through the thickness of the second member, each aperture having at least one rounded side wall for supporting at least one optical fiber without subjecting the optical fiber to an abrupt change of direction.

22. The apparatus of claim 20 wherein:
at least a plurality of apertures extends through the second flat member near a junction with a single first flat member;

at least a plurality of optical fibers each has a first end extending through an aperture to couple to an optical input device of a first one of the first flat members and a second end extending through another aperture to couple to an optical output element of a second one of the first flat members.

23. The apparatus of claim 19 wherein:
the second flat member comprises opposite substantially parallel first and second faces each having length and width dimensions substantially greater than a thickness dimension separating the first and second faces;

an edge wall of the second flat member has a width equal to the thickness dimension and interconnects the first and second faces;

the edge wall of the second flat member contacts the first edges of the first flat members, and the first and second faces of the second flat member is substantially perpendicular to the first edges of the first flat members.

24. The apparatus of claim 23 wherein:

at least certain ones of the optical fibers each connect an input optical element of one flat member with an output optical element of another first flat member and are included in an arcuate groove in the first face of the second member extending between two first flat members.

25. A method for interconnecting a plurality of first flat members comprising the steps of:

forming a plurality of apertures in a second flat member at a plurality of locations;

mounting the first flat members transversely to the second member such that edges of the first member abut a first face of a second member;

mounting optical fibers on a second face of the second member opposite the first face such that they extend through apertures and interconnect the first flat members;

said optical fiber mounting step comprising the steps of:

(a) applying a peelable sheet element over each of the apertures;

(b) adhesively mounting the optical fibers on paths overlying the peelable sheet elements and extending between apertures;

(c) peeling back the peelable sheet elements to expose the apertures;

(d) attaching a connector to the free ends of fibers supported on the peelable sheets;

(e) and protruding the connectors through the apertures to make contact with optical conductors of the first flat members.

26. The method of claim 25 wherein:

part of a MAC connector is adhesively mounted on each peelable sheet prior to the optical fiber mounting;

optical fibers are mounted in V-grooves of the MAC connector part; and after the peeling back step, the MAC connector is assembled.

27. The method of claim 26 further comprising the step of:

between step (b) and (c), adhesively mounting a plastic sheet over the optical fibers.

* * * * *